Figure 1:
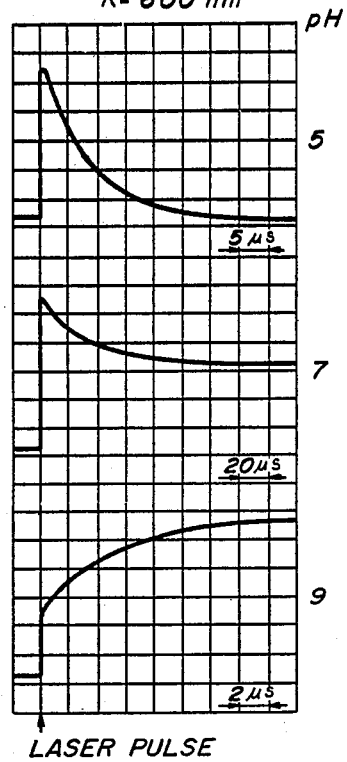

United States Patent [19]

Gratzel et al.

[11] 4,367,131

[45] Jan. 4, 1983

[54] PHOTOLYTIC PRODUCTION OF HYDROGEN FROM WATER

[75] Inventors: Michael Gratzel, Vaud; Pierre-Alain Brugger, Les Thioleyres; Pierre Cuendet, Apples, all of Switzerland

[73] Assignee: Engelhard Corporation, Iselin, N.J.

[21] Appl. No.: 279,909

[22] Filed: Jul. 2, 1981

[30] Foreign Application Priority Data

Jul. 8, 1980 [GB] United Kingdom ............... 8022339

[51] Int. Cl.$^3$ .......................... C01B 1/03; B01J 31/02
[52] U.S. Cl. .............................. 204/157.1 R; 252/430; 423/648 R
[58] Field of Search ................. 204/157.1 R; 252/430; 423/648 R, 675

[56] References Cited

U.S. PATENT DOCUMENTS 3,737,337  5/1973  Schnoring et al. ............... 252/430
3,755,192  8/1973  Rottig et al. ...................... 252/430
3,909,444  9/1975  Anderson et al. ................ 252/430
3,997,472 12/1976  O'Driscoll et al. .............. 252/430
4,252,677  2/1981  Smith .............................. 252/430
4,252,678  2/1981  Smith .............................. 252/430

FOREIGN PATENT DOCUMENTS 1445859  8/1976  United Kingdom .

OTHER PUBLICATIONS

Paleocrassas, Solar Energy, vol. 16, 1974, pp. 45–51.
Meisel, J.A.C.S. 101, (1979), pp. 6133–6135.

Primary Examiner—Arthur P. Demers

[57] ABSTRACT

The photodissociation of water into hydrogen gas is mediated by a catalytic dispersion of fine metal particles. This dispersion is stabilized by polymers of alkylene glycols which are adsorptive to said particles and which act as protective agents in solution.

30 Claims, 7 Drawing Figures

PHOTOLYTIC PRODUCTION OF HYDROGEN FROM WATER

This invention relates to an improved catalyst for mediating the photolytic conversion of water into hydrogen gas.

Water and sunlight are abundantly available resources and hydrogen gas is a nonpolluting fuel. Therefore, the discovery of an improved catalyst for converting these resources into hydrogen gas represents a significant advance in the art.

BACKGROUND

The concept of using solar energy to convert water into fuel is an attractive alternative to present day energy sources; however, a lack of technology has made this goal difficult to achieve.

Energy derived from solar radiation cannot always be used directly in a practical manner. Moreover, such energy does not always lend itself to storage for use when sunlight is not available.

Accordingly, much attention has been directed to improving photochemical processes so that the energy generated by such methods can be produced in good yields and stored efficiently.

THE INVENTION

This invention provides a new and improved catalyst for mediating the production of hydrogen gas from water.

This invention also relates to an improvement on known methods for producing hydrogen gas via the visible light irradiation of aqueous systems capable of absorbing light in the visible range of the spectrum.

The subject process improves on known methods for converting water and light energy into a storable fuel by providing a new and improved metal catalyst for use in photolytic processes.

Since water is transparent to visible light a photosensitizer (sensitizer) is used to absorb the incident light and transfer its energy to water molecules through the intervention of an electron relay. The reducing species which is produced by this reaction acts to generate hydrogen from solution.

Specifically, the irradiation of such solutions with visible light results in the molecular excitation of a photosensitizer electron and this excited state of the molecule possesses the ability to reduce water, as protons, to evolve hydrogen.

However, in practice, there is little or no observable evolution of hydrogen from water.

Accordingly, it has been found necessary to utilize catalysts to promote the reduction of water and the evolution of hydrogen.

Applicants have now discovered a new class of stabilized catalysts in finely dispersed form which mediate the interaction of the reducing species with water and significantly improve the yield of hydrogen gas. These catalysts consist essentially of one or more Noble metals in finely divided form admixed with a water permeable protective agent. The protective agent is adsorptive to said metal or said mixture of metals and it consists essentially of one or more alkylene glycol polymers derived from monomer units of the formula:

wherein n is an integer greater than 1 and at least a portion of said polymer contains monomer units having n equal to or greater than 3. Generally, the protective agents have a molecular weight in the range of from between about 200-200,000.

These catalysts are prepared by admixing one or more of said protective agents with an aqueous mixture of one or more Noble metals in reduced form. Specifically, this method comprises: (1) adding a reducible Noble metal compound or mixture of Noble metal compounds to an aqueous medium; (2) reducing said metal compounds or mixture of Noble metal compounds with a reducing agent; and (3) adding to the resulting mixture of step (2) a protective agent of the type hereinbefore defined. Preferably, the mixture obtained upon adding said Noble metal compound(s) to the aqueous medium of step (3) is maintained at a pH in the range of from about 6–8.

This preparative method is described in greater detail in the embodiments which follow.

The photolysis process which is mediated by the subject catalysts is examined immediately below so as to better illustrate the point of novelty and the relationship of said catalysts to the overall reaction.

Reaction mechanism:

The photolytic production of hydrogen from water requires the irradiation of an aqueous solution by light in the visible region of the spectrum (400–700 nm).

The aqueous solution which is thus irradiated also requires the combined action of a sensitizer (S) for light absorption, an electron acceptor (A) for mediating water reduction and transfer of electrons, an electron donor (D) for regenerating the sensitizer (S) and a stabilized metal catalyst in colloidal form to enhance hydrogen yields:

(1) The sensitizer (S) must absorb visible light energy (400–700 nm) to the extent that it achieves an electronically excited state (S*);

(2) The electron acceptor (A) must be capable of accepting electrons from the excited state sensitizer (S*). The loss of said electrons results in the sensitizer having become oxidized (S+);

(3) The electron donor (D) must be capable of giving up electrons to the oxidized sensitizer (S+); and (4) The colloidal stabilized catalyst must promote electron transfer from the reduced acceptor (A−) to the accepting water protons so as to mediate the evolution of hydrogen gas.

We have discovered that certain metal catalysts in finely divided form are particularly useful in mediating the reaction (4) between water and the reducing species (A−) to afford relatively high yields of hydrogen.

This class of catalysts is identified by critical parameters which are discussed hereinafter.

The photolysis process will now be examined in greater detail so as to better explain the function of said catalysts and the mechanism by which they promote hydrogen evolution.

1. The irradiation of the sensitizer (S) results in the formation of its excited state (S*) according to the equation:

(I)

This excited state (S*) of the sensitizer molecule (S) exhibits strong reducing properties. Its reduction potential indicates that it should reduce water in the form of hydrogen gas. However, the reduction of water to hydrogen is inhibited by various factors which include decay of the excited state sensitizer (S*) and regeneration of sensitizer starting material (S).

2. Accordingly, an electron acceptor (A) which is capable of being reduced by the excited state sensitizer (S*) and which itself can reduce water, is combined with the excited state sensitizer (S*) to afford the redox couple S+ and A−:

$$S^* + A \rightleftharpoons S^+ + A^- \qquad (II)$$

This electron transfer from excited state sensitizer (S*) to electron acceptor (A) also results in the oxidative quenching of the excited state sensitizer (S*) and, accordingly, S* is converted to S+.

It is in the following reduction step that the catalysts of this invention are uniquely employed.

The reduction of water to hydrogen via the reducing species A− requires the presence of a catalyst in order to effectively generate the production of hydrogen from solution, resulting, incidentally, in the regeneration of acceptor (A):

$$A^- + H_2O \xrightarrow{\text{Catalyst}} \tfrac{1}{2}H + OH^- + A \qquad (III)$$

Heretofore, the catalysts used in photolytic processes have not been able to generate hydrogen in appreciable quantities. The subject invention overcomes this obstacle by providing a new class of stabilized metal catalysts in finely dispersed form which have the effect of increasing significantly the amount of hydrogen generated from aqueous solutions. This aspect of the invention is discussed below.

3. Finally, to complete the photolysis process, the sensitizer (S) should lend itself to regeneration. This regeneration can be achieved by an electron transfer from the donor (D) to the oxidized sensitizer (S+):

$$S^+ + D \rightarrow S + D^+ \qquad (IV)$$

For the purposes of this invention the electron donor (D) herein described is a sacrificial species which is irreversibly oxidized in regenerating the sensitizer (S).

To illustrate the nature and scope of this invention there is described below a more detailed analysis of the reaction conditions and reactants needed to effectively generate hydrogen gas by photolytic means.

Sensitizer:

A suitable photosensitizer is one which provides a strong absorption of light over an appreciable region of the visible spectrum in aqueous solutions. Moreover, it must be capable of giving up electrons to the electron acceptor (A).

Suitable photosensitizers include, for example, cationic ruthenium and rhodium complexes containing bipyridyl ligands: Ru(bipy)$_3^{+2}$, the rhodium species: Rh(bipy)$_3^{+3}$ or other metal complexes such as Ru(phen)$_3^{+3}$ where "phen" represents orthophenanthroline or acridines, phthalocyanines and porphyrines as, for example, water soluble porphorines such as sulfonated zinc porphyrine and the like.

Other photosensitizers include proflavine, acriflavine, Co(bipy)$_2^{+2}$, Co(bipy)$_3^{+2}$, bis- and tris-(bipyridine)iridium complexes such as [Ir(bipy)$_2$H$_2$O(bipy)$_{sesqui}$]$^{+3}$.

These photosensitizers may be used individually or in combination as mixtures. Moreover, certain compounds such as proflavine may serve both as a photosensitizer and as an electron acceptor.

Acceptor:

A suitable acceptor should be reducible by the photosensitizer. Moreover, following the electron transfer the acceptor (A) should have a reduction potential of such magnitude as to be capable, in a thermodynamic sense, of reducing water molecules to hydrogen.

Suitable acceptors include, for example, methylviologen (MV$^{+2}$) of the following structure:

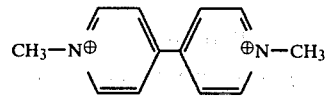

and, various metal cations such as vanadium, europium and titanium cations, that is, V$^{+3}$, Eu$^{+3}$ and Ti$^{+3}$, including too water soluble complexes of said metals such as the salicylate complexes. Also included are macrocyclic complexes formed by ions such as Co$^{+2}$ and amino complexes such as cobalt aza crown complexes and quinones.

Donor:

The criteria for a suitable electron donor (D) are:

(1) The donor molecule must transfer at least one electron to the oxidized sensitizer (S+) in an efficient manner such that recycling of the sensitizer does not limit the overall rate of hydrogen production and (2) The oxidized donor species must not react with the reduced acceptor species directly or indirectly at a rate which eliminates or significantly diminishes the hydrogen evolution rate.

Effective donors are, for example, triethanolamine (TEOA), ethylenediaminetetraacetic acid (EDTA) disodium salt, cysteine and the like.

Reaction Conditions:

Irradiation:

The irradiation of the system was achieved by using a 450 watt lamp as a light source. A 400 nm cut-off filter was placed in the beam to eliminate ultraviolet wave lengths. A 15 cm. water cell absorbed the infrared light. Laser photolysis experiments were performed with a J.K. 2,000 frequency doubled neodynium laser. The Q-switched pulse typically had a duration of 20 ns and an energy of approximately 100 mJ. All samples were rendered free from oxygen by flushing with helium.

Hydrogen analysis:

The instrument used for analysing hydrogen was a Gow-Mac thermal conductivity detector. The analyses were made after separation by chromotography on a Carbosieve 5A column.

Reaction pH:

Solution acidity had a decided effect upon the rate of hydrogen evolution. In general, the rate of hydrogen evolution decreased as the medium became either highly acidic or highly basic. Optimum pH levels and the effect of high and low pH ranges is discussed in detail in the "Preferred Embodiments".

Catalyst:

The point of novelty in this invention resides in the use of a new and improved metal catalyst in a finely divided form.

We have identified certain critical parameters which determine the chemical nature, form and preparative mode for the subject catalysts as a result of which they are highly effective in intercepting the very fast recombination reactions, that is, the reverse of reaction (II) above, and they produce high hydrogen yields.

We have discovered that the Noble metals and/or their oxides are suitable as catalysts for mediating the hydrogen evolution reaction and intercepting the wasteful reverse redox reaction shown as equation (II) above.

More particularly, we have found that those metals of Group VIII known as the Noble metals, namely, platinum, palladium, ruthenium, rhodium and iridium are effective as catalysts in the subject process.

Most preferred of these Noble metals are palladium and platinum of which platinum is particularly preferred.

Also, we have discovered that the particular mode by which these catalysts are put into a stabilized form augments their superior performance in photocatalytic systems.

Thus, fine dispersions of the said metals in solution and particularly the colloidal form has been found to be particularly effective. Colloidal stabilized platinum metal dispersions are particularly useful and afford the highest order of activity and selectivity in intercepting recombination reactions to afford hydrogen as a product in high yields.

The methods for preparing these colloidal catalysts are described with greater particularity in the Preferred Embodiments.

PREFERRED EMBODIMENTS

Experimental:

Because water is transparent to visible light it must be sensitized to accept the visible rays of the sun, whereupon, it should decompose according to the following equation:

$$H_2O \rightarrow H_2 + \tfrac{1}{2}O_2 \quad (V)$$

Ruthenium tris bipyridyl cation, $Ru(bipy)_3^{+2}$, is a suitable sensitizer (S) for such a decomposition reaction and the following equation illustrates the effect of light absorption on this substance and the resultant electron transfer which occurs:

$$Ru(bipy)_3^{+2} \xrightarrow{h\nu} [Ru(bipy)_3^{+2}]^* \quad (VI)$$
Ground State (S)    Excited State (S*)

where the asterisk indicates the electronically excited state (S*) of said sensitizer. This excited state (S*) can be detected spectroscopically from its decay luminescence at 615 nm. It exhibits strong reducing properties and, theoretically, it should reduce water as protons to afford hydrogen. However, the continuing luminescence of the sensitizer cation in aqueous solution indicates that the reduction reaction is too slow to compete with the excited state decay. Accordingly, since the ruthenium tris bipyridyl cation (S*) is not able to perform the desired reduction of water to hydrogen the excitation energy of said cation is used to transfer electrons to a suitable electron acceptor (A), such as methylviologen, that is, $MV^{+2}$ (A) according to the following equation:

$$[Ru(bipy)_3^{+2}]^* + MV^{+2} \rightleftharpoons MV^+ + Ru(bipy)_3^{+3} \quad (VII)$$

Confirmation of this electron transfer VII was performed by monitoring the characteristic absorptions of $MV^+$ at 395 and 605 nm, the bleaching of $Ru(bipy)_3^{+2}$ ground state absorption at 452 nm and the luminescence of $[Ru(bipy)_3^{+2}]^*$ at 615 nm. The signal at 605 nm grows concomitantly with the 615 nm luminescence decay indicating that the quenching of excited states leads to the formation of reduced methylviologen ($MV^+$; Equation VII).

The reduced methylviologen radical, $MV^+$ ($A^-$), provides the means by which water is actually reduced to hydrogen:

$$2MV^+ + 2H_2O \xrightarrow{Catalyst} 2MV^{+2} + H_2 + 2OH^- \quad (VIII)$$

This reaction is mediated by the novel metal catalysts of this invention hereinafter described.

A comparison of the reduction potential of the redox couples, $MV^+$ and $Ru(bipy)_3^{+3}$ (Equation (VII)), indicates that said reaction is endoergic by 1.7 eV with respect to the ground state $Ru(bipy)_3^{+2}$. This energy difference provides the driving force for the following reverse-reaction which occurs spontaneously at a high rate:

$$(IX) \quad MV^+ + Ru(bipy)_3^{+3} \rightarrow MV^{+2} + Ru(bipy)_3^{+2} \quad (IX)$$

Confirmation of this was shown by the long-time behaviour of the $MV^+$ absorption of 600 nm.

The reverse-reaction (IX) may be prevented by the addition of a donor species (D) which is capable of reducing $Ru(bipy)_3^{+3}$ to $Ru(bipy)_3^{+2}$. This reduction reaction is illustrated by the following equation wherein triethanolamine (TEOA) is the donor species:

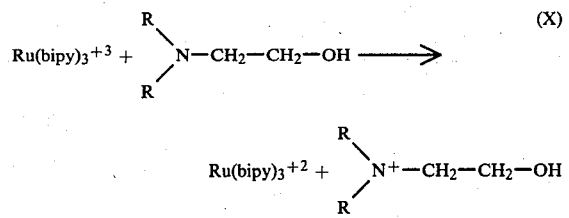

(X)

wherein R in both occurrences represents $-CH_2-CH_2-OH$. In reaction (X) the TEOA intercepts the reverse reaction (IX) with a rate constant of $6.5 \times 10^6$ $M^{-1}S^{-1}$. In the absence of catalytic interception of the reduced acceptor, high concentration of TEOA have been shown to be necessary for moderately efficient interception and regeneration.

An examination of the reaction between the donor species (D) with oxidized sensitizer, $Ru(bipy)_3^{+3}$, to reform the sensitizer for recycling purposes, indicates that high concentrations for the donor species, relative to the initial sensitizer concentrations, are necessary for effective interception.

The following equations illustrate the mechanism of the subject process together with the intercepting reactions:

$$Ru(bipy)_3^{+2} + MV^{+2} \xrightarrow{h\nu} Ru(bipy)_3^{+3} + MV^+ \quad (XI)$$

$$2MV^+ + 2H_2O \xrightarrow{Catalyst} MV^{+2} + H_2 + 2OH^-$$

$$Ru(bipy)_3^{+3} + TEOA \rightarrow Ru(bipy)_3^{+2} + H^+ + TEOA^+$$

In this system (XI) the $MV^+$ concentration is critically dependent on both the TEOA concentration and the pH of the solution. The effect of pH on $MV^+$ concentration is illustrated in FIG. 1. From the inserted oscilloscope traces it is seen that the 600 nm absorption gradually decays in the microsecond time range until a plateau is attained. This remaining absorption in the absence of oxygen is stable over days giving the solution the characteristic blue color of $MV^+$. Upon admission of air to be solution, the blue color vanishes. The ratio of absorbences obtained in the plateau region to that initially present after the laser pulse, $\eta = A_p/A_o$, as well as the rate of the fractional decay, increase with TEOA concentration.

The fractional decrease in the $MV^+$ absorption cannot be attributed solely to a simple competition of reactions IX and X, that is, $Ru(bipy)_3^{+3}$ reduction by $MV^+$ and TEOA, respectively, and the experimental evidence indicates that the second oxidant produced in solution, that is, the cation radical $TEOA^+$ is also capable of extracting and electron from $MV^+$:

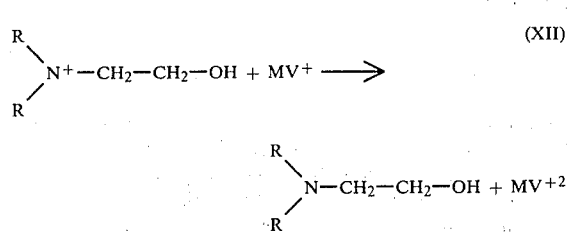
(XII)

In acid medium, all of the $MV^+$ formed in the photoredox process VII is reoxidized to $MV^{+2}$. A drastic change in noted in alkaline medium.

These observations may be explained in terms of an acid-base equilibrium of the TEOA cation:

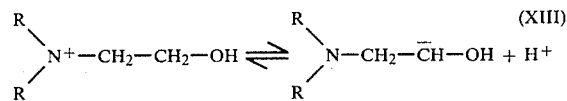
(XIII)

At pH 9 the cation $TEOA^+$ deprotonates to yield a neutral radical with the unpaired electron in $\alpha$-position to either the amino or alcohol group. Such a species is expected to exhibit reducing instead of oxidizing properties. Hence, after deprotonation of $TEOA^+$, the reoxidation of $MV^+$ can no longer occur. At pH 9, the proton loss seems to be rapid enough to dominate over the competing back electron transfer (XII). Thus, practically all of the $MV^+$ initially produced in the photoredox process remains in the reduced state. The strong reducing properties of the neutral TEOA radical manifests itself also through the fact that it is capable of transferring an electron to $MV^{+2}$:

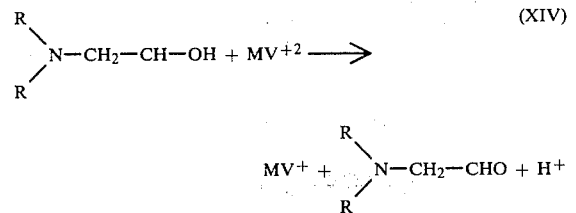
(XIV)

At pH 5, the equilibrium situation seems to favour the protonated form of the radical. As a consequence, the reverse-reaction (XII) cas occur. The system is cyclic and no permanent chemical changes are induced by light.

In neutral solution, the protonated and unprotonated radical forms coexist. Here the reactions (X), (XII) and (XIII) occur simultaneously. As a result, only a fraction of the $MV^+$ initially produced can be preserved from reoxidation. As the deprotonation of $TEOA^+$ is a base catalyzed reaction, its rate will depend not only on the pH but also on the concentration of TEOA which itself can act as a proton acceptor. This explains why in FIG. 3 the $MV^+$ decay is enhanced by increasing the TEOA concentration while at the same time the fraction of $MV^+$ which is reoxidized decreases.

When cysteine was substituted for TEOA as an electron donor the reduction of $Ru(bipy)_3^{+3}$ occurred at a rate of $3.7 \times 10^6$ $M^{-1}S^{-1}$. Analogous to the TEOA system, the deprotonation of the cysteine cation (Cys-$SH^+ \rightarrow Cys\text{-}S^- + H^+$) also represents the crucial step through which the reverse-reaction of Cys-$SH^+$ with reduced methylviologen is prevented. Thus, in neutral solution at 0.05 M cysteine 35% of the $MV^+$ escapes from reoxidation while at pH 9, this fraction increases to almost 100%. The equivalent of reaction (XIV), that is, reduction of $MV^{+2}$ by Cys-$S^-$ does not occur in this system.

Catalysts

Metal System:

We have determined that aqueous dispersions of Noble metals such as the Platinum Group metals or silver and gold, including mixtures thereof, in finely divided form in the presence of a protective agent are eminently suited for mediating the light-induced evolution of hydrogen from water. The Noble metal catalysts in colloidal form are particularly suited for this purpose. Both particle size and the nature of the protective agent affect the rate of hydrogen production.

A wide variety of catalysts were examined including commercially available metals and metal oxide powders as well as novel catalysts prepared according to methods described hereinbelow.

Catalysts comprising metals or metal oxide dispersions of platinum, palladium, ruthenium, rhodium, iridium, osmium, silver, gold and mixtures thereof are active in the system. In particular, stabilized colloidal platinum metal dispersions afforded the highest order of activity and the best selectivity in intercepting recombination reactions thus assuring high yields of hydrogen.

Protective Agent:

In general, the effectiveness of this catalyst-protective agent combination depends on the type of metal employed and the nature or type of protective agent which is used to maintain said metal in a liquid medium, for example, water, in a dispersed form. A second factor is particle size.

The unit of measure for colloidal particles is the milimicron (m$\mu$) or Angstrom Unit (Å), 1 milimicron (m$\mu$) being equivalent to 10 Angstrom units.

The size of the particles in a true colloidal dispersion usually vary from about 10–1000 Å in diameter.

In the subject invention the diameter size of the colloidal particles are 50 Å or less and, preferably, they do not exceed 30–40 Å; therefore, the particles are in a very finely divided state.

The protective agent of this invention may be colloidal or non-colloidal but colloids are preferred because they assure a more stable and uniform dispersion of metal particles. Applicants do not attempt to fully explain the exact nature of the interaction between catalyst and protective agent but it appears from our observations that the improvements herein noted are due ostensibly to the manner in which the catalyst and protective agent are combined.

The protective agent should be adsorptive to the metal particles which are utilized as the catalytic agent for the reducing medium and it should be water permeable so as to allow for the intimate contact of the metal particles with the water which is being subjected to photolytic dissociation.

The protective agents which meet these conditions may be either colloidal or non-colloidal in nature. However, as stated above, in both instances, the protective agent must show an affinity for the metal particles in solution and it must be water permeable.

On the basis of our observations it appears that the colloid particles are in an intimate relationship with respect to the metal particles and the latter are thus buoyed in solution uniformly in a finely divided state to the same extent as the protective agent itself. Accordingly, there is little or no agglomeration. Instead, the metal particles remain in suspension in a finely divided state and expose a much larger surface area than would otherwise be possible were it not for the distributive effect of the protective agent.

Chemically the protective agents of this invention may be defined as polymers of alkylene glycols, preferably, lower alkylene glycols. Specifically, these polymers contain recurring units of the following moiety:

—O—(CH$_2$)$_n$—O— wherein n is an integer having a value greater than 1 and in which at least a portion of said polymer is comprised of units having n equal to or greater than 3. Accordingly, at least a portion of the alkylene group represented by —(CH$_2$)$_n$— is a propylene moiety or higher homologue. Typical of the polymers which may be used as protective agents are those having a molecular weight in the range of from between about 200–200,000 as, for example, polymers derived from ethylene glycol, propylene glycol or random and block copolymers of ethylene glycol and propylene glycol such as Carbowax 20-M ® (Union Carbide; U.S.A.) or Marlox ® and Drivanil ® (Hülls, West Germany).

Preparation of Catalysts:

The following procedures were used to prepare colloidal and non-colloidal platinum dispersions for use as catalysts. The results of a comparative study utilizing said catalyst in the photolytic production of water is set forth below.

EXAMPLE 1

Platinum-Polyvinyl Alcohol (Pt-PVA-60,000)

To 20 ml. of polyvinyl alcohol (M.S.: 60,000; 2% solution) there was added 50 mg. of H$_2$PtCl$_6$. This solution was neutralized with sodium hydroxide to pH 8.0 and then heated to 100° C. for half an hour with agitation. Water was then added to provide a solution having a total volume of 40 cc. Hydrogen gas was then passed through the solution until it became dark gray-brown indicating that platinum deposition had taken place. The pH after reduction becomes slightly acidic.

The mixture was then subjected to centrifugation. By varying time and speed of centrifugation Pt-PVA-60,000 colloid catalysts with different particle size were prepared as shown in Table 1. The supernatant contained lighter particles while the heavier particles were found in the deposit. About 20% of the initial platinum is in the deposit. About 20% of the initial platinum is in the supernatant when the centrifugation takes place at 20,000 r.p.m. (10,000 g.) and the rest is in the residue.

TABLE 1

| Sample | Concentration mg Pt/25 cc Solution | Diffusion 10$^{-7}$ Cm$^2$/sec | $R_h$ Å | Centrifugation time, hours | RPM Centrifugation |
|---|---|---|---|---|---|
| Pt-PVA-60000 | 3.5 | 2.05 | 110 | 10 | 20000 |
| Pt-PVA-60000 | 3.5 | 0.73 | 320 | 8 | 13000 |
| Pt-PVA-60000 | 3.5 | 0.67 | 360 | 2 | 13000 |
| Pt-PVA-60000 | 3.5 | 0.45 | 530 | 0 | — |
| PVA-60000 | 0 | 2.10 | 105 | 0 | — |

Note:
$R_h$ represents the hydrodynamic radium of the combined platinum and colloid particles.

EXAMPLE 2

Colloidal Platinum-Catalysts

Step A: Platinum Sol

Colloidal platinum was obtained via reduction of hexachloroplatinate solutions by sodium citrate.

A solution containing 15 mg Pt in the form of H$_2$PtCl$_6$ in water (225 ml) was brought to boiling. A 1% by weight aqueous solution of sodium citrate (30 ml) was added and the mixture was refluxed for 4 hours. The solution was then cooled in an ice bath.

Excess citrate and electrolyte were removed by stirring the solution with an AMBERLITE-MB-1 exchange resin in its H+ and OH− form until the conductivity of the solution was smaller than 5 μs/cm. After filtration the protective agent was added and allowed to equilibrate with the Pt-sol for at least one hour. The platinum content of the solution was determined by atomic spectroscopy. The size of the platinum particles was determined by electron microscopy. Samples were prepared by spraying the colloidal solutions in small droplets (1–10 μm diameter) with an atomizer on membranes coated with carbon and observations were made with an electron microscope.

Step B: Stabilized Platinum Sol

The platinum-sol prepared according to Step A was added to aqueous solutions of NaCl (0.24%) containing various protective agents and the percentage of platinum in solution was measured as a function of time. The platinum content of the solution was determined by atomic absorption spectroscopy and from optical absorbance measurements. It exhibited a characteristic absorption rising steadily towards the UV. Precipitation diminished the intensity of the band without changing its shape. Accordingly, at a given value the absorbance of the solution is proportional to the Pt concentration. The results of this invention conducted over a period of 0.05–12.4 days are shown in Table 2. The protective agents employed in this study were: ethylene glycols, Carbowax 20-M ®, polyvinyl alcohols, polyacrylic acid, anionic phosphate and hydroxyethyl cellulose.

TABLE 2

| Comparative Effect of Protective Agents | | | |
|---|---|---|---|
| | Fraction Precipitated | | |
| Protective Agent | 0.05 Days | 1.3 Days | 12.4 Days |
| Ethylene Glycol (PEG) | | | |
| PEG 5000 Methoxy | 0.05 | | 0.99 |
| PEG 10000 | 0.00 | 0.85 | 0.98 |

TABLE 2-continued

Comparative Effect of Protective Agents

| Protective Agent | Fraction Precipitated | | |
|---|---|---|---|
| | 0.05 Days | 1.3 Days | 12.4 Days |
| PEG 20000 | 0.00 | 0.48 | 0.94 |
| Carbowax 20-M ® (PEG 15000-20000) | 0.00 | 0.01 | 0.05 |
| Polyvinyl alcohols | | | |
| PVA 13000 99% Hydrolyzed | 0.00 | 0.02 | 0.08 |
| PVA 42000 | 0.00 | | 0.07 (Stable but less so than Carbowax ®) |
| PVA 60000 | 0.00 | 0.03 | 0.08 |
| Polyacrylic Acid | | | |
| PAA 3500 | 0.00 | 0.030 | 0.106 |
| PAA 27000 | 0.00 | 0.031 | 0.128 |
| PAA 76000 | 0.00 | 0.019 | 0.109 |
| Anionic Phosphate (Calgon ®) | 0.00 | 0.03 | 0.28 |
| Hydroxyethyl Cellulose | 0.00 | 0.02 | 0.09 |
| No protective Agent | 0.00 | 0.79 | 1.00 |

Conditions: 0.24% Aqueous NaCl; Pt: 30 mg/l; Protective Agent: 100 mg/l.

The unprotected platinum precipitates to 80% within 1.3 days, the coagulation being complete after 12.4 days of exposure to sodium chloride. Polyacrylic acid and the anionic polyphosphate (Calgon ®) are good protective agents. However, they are inferior to hydroxyethycellulose and polyvinyl alcohol. Methoxy-terminated PEG 5000 shows no protective action. As the molecular weight increases the picture improves slightly, PEG 20000 still being a poor stabilizing agent. A significant improvement is noted when copolymers such as Carbowax 20-M ® and other lower molecular weight copolymers of oxyethylene and oxypropylene are employed as protective colloids. With these agents optimum stability of the platinum sol is obtained.

The outstanding stability of the Carbowax sol is apparent for example at higher NaCl concentrations. Table 3 below sets forth flocculation test data where the NaCl content of the solution was maintained at 1% and the performance of Carbowax 20-M ® is compared to polyvinyl alcohols of different molecular weight and composition.

TABLE 3

The Stabilizing Effects of Polyvinyl Alcohols and Carbowax 20-M ®

| Protective Agent | % Hydrolyzed | Fraction Precipitated; 4 Days |
|---|---|---|
| PVA 15000 | 86-89 | 0.84 |
| PVA 22000 | 97.5-99.5 | 0.75 |
| PVA 42000 | 99 | 0.00 |
| PVA 49000 | 86-89 | 0.99 |
| PVA 60000 | | 1.00 |
| Carbowax 20-M ® | | 0.00 |

Conditions: 1% aqueous NaCl. Pt: 26.5 mg/l; Protective Agent 100 mg/l.

The data of Table 3 demonstrates that there is a trend to lower stability as the percentage of hydrolyzed acetate functions increases. Only PVA 42000 (i.e., Alcotex 99/10) which contains 1% acetate groups is not susceptible to precipitation thus matching the performance of Carbowax 20-M ®.

The relative efficiencies of the platinum catalysts described in Example 2 were texted for their ability to mediate the light-induced generation of hydrogen from water. The results of this study are shown in Example 3.

EXAMPLE 3

Platinum Catalyst Study; $H_2$ Production

The photochemical system consisted of an aqueous solution containing $Ru(bipy)_3^{2+}$ ($4 \times 10^{-5}$ M) as a sensitizer and methylviologen, that is, $MV^{2+}$ ($2 \times 10^{-3}$ M) as an electron relay, the kinetics and mechanism of which have been described hereinabove. EDTA ($10^{-2}$ M) was used as a sacrificial donor which undergoes irreversible oxidation. All solutions contained a platinum concentration of 3.7 mg/l and were protected by a 12.5 mg/l of polymer. The polymers employed are listed below as compounds (a)-(n):

| | Compound | | |
|---|---|---|---|
| (a) | PEG 5,000 | (h) | PAA 3,500 |
| (b) | PEG 10,000 | (i) | PAA 27,000 |
| (c) | PEG 20,000 | (j) | PAA 76,000 |
| (d) | Carbowax 20-M | (k) | Hydroxyethyl Cellulose |
| (e) | PVA 13,000 | (l) | None |
| (f) | PVA 42,000 (Alcotex 99/10) | (m) | Anionic Phosphate (Hexameric-phosphate); (Calgon ®) |
| (g) | PVA 60,000 | (n) | PVA 60,000 ($H_2$ reduced and Centrifuged) |

Figure 2:
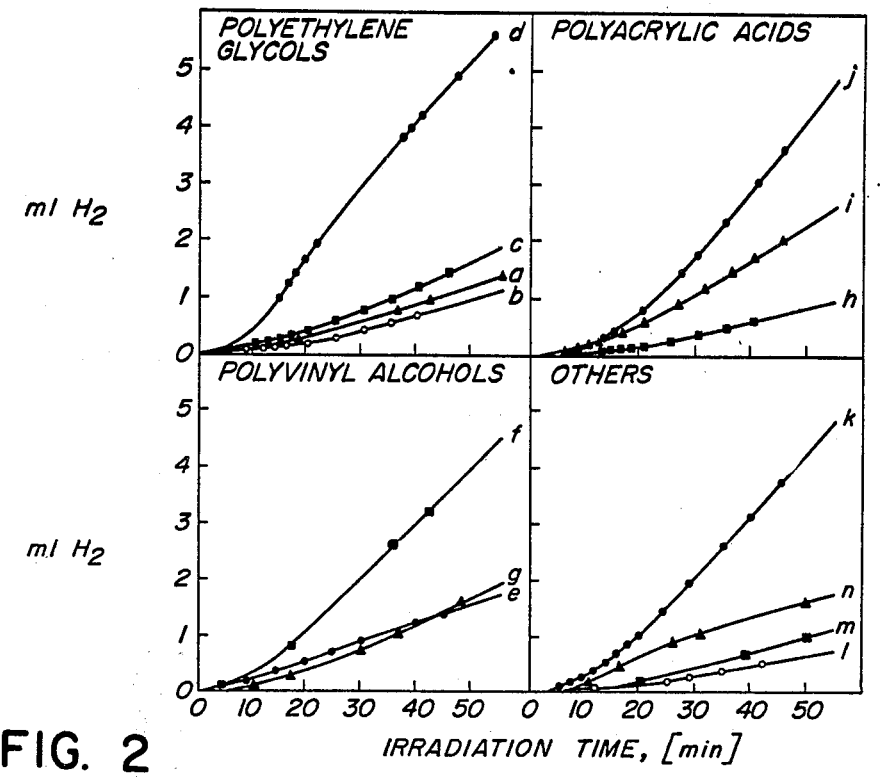

Potassium-hydrogen phthalate buffer ($5 \times 10^{-3}$ M) was used to maintain the pH of the solutions at 4.5. FIG. 2 indicates the amount of hydrogen produced during the first hour of photolysis using the protective agents identified above as compounds (a)-(n).

Figure 3:
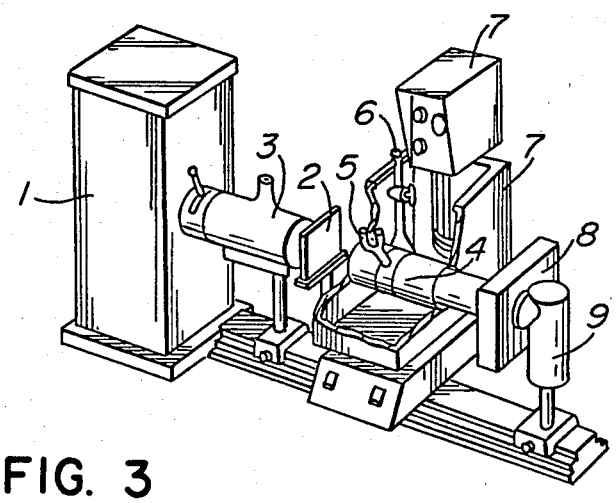

Irradiations were carried out in the cell device of FIG. 3. An Osram XBO 450-W lamp 1 was used in conjunction with a ≡400 nm cut-off filter 2 and a 15-cm water cell 3 absorbed the infrared radiation. The catalyst solution (35 ml) was contained in a cylindrical cell 4 equipped with one side arm for deoxygenation prior to illumination and a second side arm 6 for the volumetric determination of hydrogen. This determination was effected by measurement in a hydrogen burette or by chromatograph. Both the $H_2$-burette and the cell were imbedded in a water jacket 7 maintained at 25° C. The light beam, after traversing the cell, impinges on a monochromator 8 connected to a photodiode 9 allowing for the measurement of optical density changes in the solution during illumination. The solution was maintained at a pH of 4.5 using potassium-hydrogen phthalate buffer ($5 \times 10^{-3}$ M).

The hydrogen evolution rates are reported in FIG. 2 at 25° C.±0.1° C. at a total solution volume of 35 ml. The data in this Figure indicates that the hydrogen generation rate is strongly affected by the nature of the polymeric stabilizer. Unprotected Pt, PAA 3500 and PEG 10000 are at the low end of the efficiency scale followed by PEG 5000, PVA 13000, PVA 60000, PEG 20000 and PAA 27000. The performance of PAA 26000, hydroxyethylcellulose, Alcotex-99 and Carbowax was excellent. Carbowax 20 M ® exhibited optimum efficiency with a hydrogen output of ca 8 ml/hour. Moreover, in all of these experiments the EDTA content is only $3.5 \times 10^{-4}$ mole which, when totally consumed, can theoretically yield only 7.8 ml of hydrogen; therefore, when 6 ml of $H_2$ are produced the EDTA supply of the system has been used up almost completely. However, with the Carbowax catalyst no decline of the $H_2$ generation rate is observed until practically the end of the irradiation period. At this point the turnover numbers for the sensitizer and electron relay are 200 and 4, respectively.

The effect of a Carbowax 20 M ® system over a longer period also was studied for solutions containing $10^{-1}$ M EDTA. After an induction time of several minutes, the rate of H₂ generation established itself at 9 ml/hour as observed at the lower EDTA concentration. This was sustained for several hours without any noticeable degradation of the sensitizer, turn-over numbers being in excess of 1000. The process of hydrogen generation slowed down once the solution pH rose due to exhaustion of the buffer. High pH-conditions are of course detrimental to both the sensitizer and the electron relay.

Included in FIG. 2 are the results obtained with the PVA/Pt catalysts prepared via the reduction of hexachloroplatinate solutions with hydrogen as hereinbefore described. The constitution of the Pt-particles was different in this instance. They were larger (mean diameter of 200 Å instead of 30 Å) and of higher polydispersity than the sol produced via citrate reduction. Although excellent results were obtained with this preparation at high Pt-levels (100 mg/l) in dilute solutions the activity was at least forty times lower on a per mg Pt basis than that of Pt/Carbowax.

Figure 4:
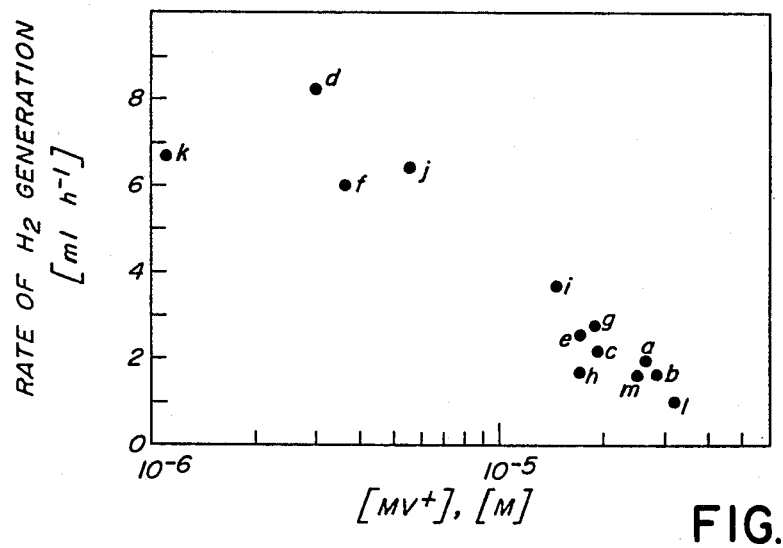

FIG. 4 indicates the relative yield of hydrogen obtained with different protective agents as a function of the steady state concentration of reduced viologen (MV⁺) present under illumination. The lettered designations in FIG. 4 correspond to the lettered compositions in FIG. 2.

Catalysts that are relatively inefficient in hydrogen production afford high MV⁺ levels in the photo-stationary state. Good catalysts, on the other hand, give small MV⁺ levels due, ostensibly, to the fact that the concentration of the MV⁺ intermediate is very small, indicating that reoxidation via an electron transfer to the platinum particle occurs very rapidly.

Figure 5:
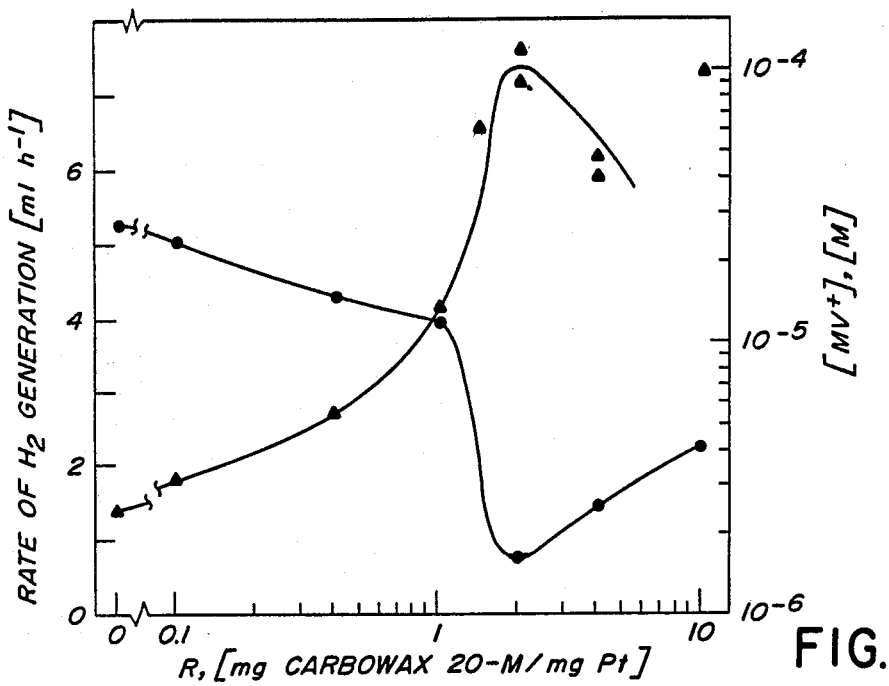

The promotion of redox catalysis by the protective polymer is apparent from a detailed study of the Pt/Carbowax system, specifically, the effect of Carbowax concentration on the rate of light induced H₂ evolution. FIG. 5 shows that upon increasing the mass ratio of polymer to platinum (R) from 0 to 2 the hydrogen output is augmented by a factor of more than 4. At the same time the MV⁺ level present under photostationary conditions decreases.

This MV⁺ decrease is particularly pronounced between R values of 1 and 2 where the MV⁺ concentration diminishes abruptly by a factor of 8. FIG. 5 shows that an increase of the Carbowax content above R=2 results in a decrease of the hydrogen output and this effect is associated with a rise in the MV⁺-level.

Figure 6:
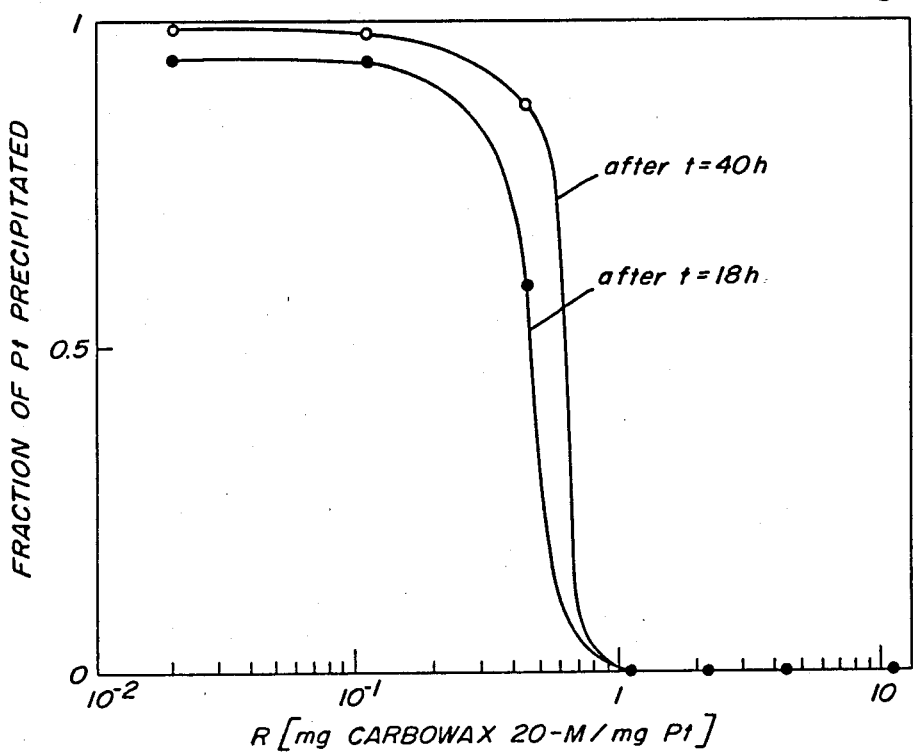

FIG. 6 illustrates the flocculation behavior of a sol containing 45 mg/l Pt in 1% aqueous NaCl solution as a function of Carbowax concentration.

When R is equal to 0.5 the colloid is still highly unstable, 60% and 87% of the dispersed platinum being precipitated after 18 and 34 hours of exposure to NaCl, respectively. However, if R is greater than 1 no flocculation at all is observed, indicating that this concentration of Carbowax suffices for efficient protection of the Pt-sol.

Figure 7:
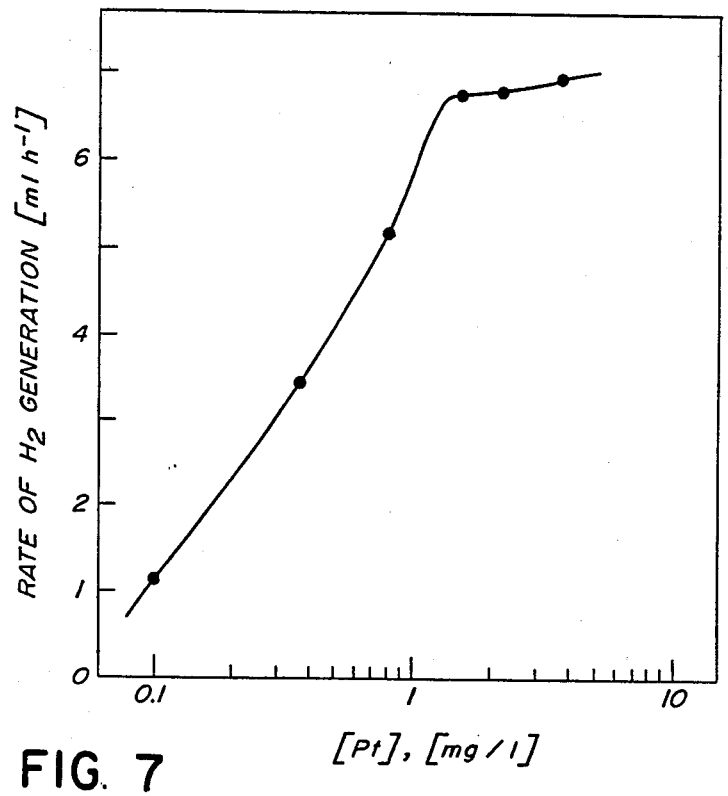

The effect of catalyst concentration on the hydrogen evolution rate is presented in FIG. 7.

The hydrogen output rises steeply with Pt-concentration up to 1.4 mg Pt/l following which further augmentation is relatively slow. At the break point, the rate is already astonishingly high in view of the very small Pt-concentration ($\sim 7 \times 10^{-6}$ M) present in solution.

Performance can be improved even further because only a fraction of the incident light (the maximum percentage is 80 for =452 nm) is absorbed by the solution at the designated Ru(bipy)₃²⁺ concentration. This condition was selected intentionally for kinetic studies in order to avoid inhomogeneities due to complete light absorption over a small pathlength. The quantum yield of H₂ production, though difficult to assess under such circumstances, is between 5 and 10%. Given these facts, the hydrogen evolution obtained with 1.4 mg Pt/per liter of Carbowax is comparable with that observed for Pt/PVA at 120 mg/l. Thus, the remarkable efficiency of the Pt/Carbowax catalyst in this instance allows for a reduction of the Pt concentration by a factor of almost 100, a feature which is of the utmost practical significance.

Structure and Constitution of the Pt/Carbowax Particles

An investigation into the nature of the colloidal aggregates in solution reveals the presence of spherical monodisperse particles. Electron micrographs taken in the absence of protective agent show the presence of spherical monodisperse particles having a diameter of from 30 to 40 Å. When Carbowax is present as a protective agent the dilute solution (5 mg Pt/l) affords a similar result. Particle diameters are between 30 and 35 Å. At high concentrations of 50 mg Pt/l the formation of clusters are apparent and some of the platinum particles form loosely connected assemblies extending over regions of several hundred nanometers.

These data indicate that the unprotected as well as the protected Pt-sol in dilute aqueous solution consists of uniformly sized particles having a diameter of 30–35 Å. If present in crystalline form a sphere of 32 Å diameter has a surface area of $3.2 \times 10^{-13}$ cm² and consists of approximately 1200 Pt-atoms. The double layer capacity of platinum is ca. 100 μF/cm² which for one particle is $C = 3.2 \times 10^{-17}$ F. At a platinum level of 1.4 mg/l corresponding to $6 \times 10^{-9}$ M aggregates the concentration of reduced methylviologen is $2 \times 10^{-6}$ M in the photo-stationary state. The reoxidation of all the MV⁺ would change the potential of a Pt-particle by $\Delta\phi = q/C = -1.66$ V where q is the number of electrons transferred to one aggregate and C is its capacity. Clearly, in view of the low concentration of electroactive species such a cathodic shift in potential is significant. A much smaller effect would be obtained if larger particles were present in solution. Thus, a tenfold increase in size would decrease the $\Delta\phi$ value to $-0.06$ V. This illustrates that large particles are not only disadvantageous from the point of view of diffusion and mass transport but also respond more slowly in their voltage decrement to charge transfer processes.

The preparation of ultrafine platinum particles now makes possible the development of a catalytic system in which light induced water reduction by a photosensitizer can be achieved without the intervention of an artificial donor.

On the basis of this experiment and the preceding studies the superiority of polyalkylene glycol-stabilized catalysts in hydrogen-generating photolytic systems is clearly demonstrated.

What is claimed is:

1. A catalyst capable of forming a stable dispersion in an aqueous medium for mediating the evolution of hydrogen from water by photolysis, said catalyst comprising an intimate admixture of one or more Noble metals in finely divided form and a water permeable protective agent adsorptive to said metal consisting of one or more alkylene glycol polymers derived from monomer units of the formula:

$$-O-(CH_2)_n-O-$$

wherein n is an integer greater than 1 and in which at least a portion of said polymer is comprised of monomer units having n equal to or greater than 3.

2. The catalyst of claim 1 wherein the catalyst particle size is no greater than 50 Å diameter.

3. A catalyst according to claim 1 for mediating the photolytic evolution of hydrogen from water wherein said Noble metal is selected from the group consisting of platinum, palladium, rhodium, ruthenium, iridium, osmium, silver or gold admixed with a protective agent having a molecular weight of from between about 200–200,000.

4. The catalyst of claim 3 wherein the protective agent is a copolymer of ethylene glycol and propylene glycol.

5. The catalyst of claim 3 wherein the protective agent is Carbowax 20-M.

6. The catalyst of claim 3 wherein the metal is platinum or palladium.

7. The catalyst of claim 3 wherein the metal is platinum and the protective agent is a copolymer of ethylene glycol and propylene glycol.

8. The catalyst of claim 3 wherein the metal is platinum and the protective agent is Carbowax 20-M.

9. A method for preparing a stabilized metal catalyst for mediating the photolytic production of hydrogen from water which comprises:
(1) adding a reducible Noble metal compound or mixture of Noble metal compounds to an aqueous medium;
(2) reducing said Noble metal compound or mixture of Noble metal compounds; and
(3) adding to the resulting mixture of step (2) a protective agent selected from the group consisting of one or more alkylene glycol polymers derived from monomer units of the formula:

$$-O-(CH_2)_n-O-$$

wherein n is an integer greater than 1 and in which at least a portion of said polymer is comprised of monomer units having n equal to or greater than 3.

10. The method of claim 9 wherein the mixture of step (2) is adjusted to a pH in the range of from between about 6–8.

11. The method of claim 9 wherein the Noble metal is selected from the group consisting of platinum, palladium, rhodium, ruthenium, iridium, osmium, silver or gold and the protective agent has a molecular weight of from between about 200–200,000.

12. The method of claim 9 wherein the catalyst particle size is no greater than 50 Å.

13. The method of claim 9 wherein the protective agent is a copolymer of ethylene glycol and propylene glycol.

14. The method of claim 13 wherein the protective agent is Carbowax 20-M.

15. The method of claim 9 wherein the Noble metal is platinum or palladium and the protective agent is a copolymer of ethylene glycol and propylene glycol.

16. The method of claim 9 wherein the Noble metal is platinum and the protective agent is Carbowax 20-M.

17. In the photolytic method for producing hydrogen from water by treatment with a reducing species capable of donating electrons to water; the improvement which comprises:
conducting the reduction step in the presence of a stabilized and finely dispersed catalyst comprising one or more Noble metals in finely divided form in intimate admixture with a protective agent selected from the group consisting of one or more alkylene glycol polymers derived from monomer units of the formula:

$$-O-(CH_2)_n-O-$$

wherein n is an integer greater than 1 and in which at least a portion of said polymer is comprised of monomer units having n equal to or greater than 3.

18. The method of claim 17 wherein the Noble metal is selected from the group consisting of platinum, palladium, rhodium, ruthenium, iridium, osmium, silver or gold and the protective agent has a molecular weight of from between about 200–200,000.

19. The method of claim 17 wherein the protective agent is a copolymer of ethylene glycol and propylene glycol.

20. The method of claim 19 wherein the protective agent is Carbowax 20-M.

21. The method of claim 17 wherein the Noble metal is platinum or palladium and the protective agent is a copolymer of ethylene glycol and propylene glycol.

22. The method of claim 21 wherein the Noble metal is platinum and the protective agent is Carbowax 20-M.

23. The method of claim 17 wherein the catalyst particle size is no greater than 50 Å.

24. A method for the photolytic production of hydrogen from water which comprises:
subjecting an aqueous solution containing photosensitizer to irradiation with light from the visible region of the spectrum to afford an excited state of the photosensitizer molecule; and
contacting said excited state photosensitizer with an electron acceptor to afford a reduced acceptor species which, in aqueous solution in the presence of an electron donor and a stabilized and finely dispersed catalyst reduces water to form hydrogen gas; said catalyst comprising one or more Noble metals in finely divided form in intimate admixture with a protective agent selected from the group consisting of one or more alkylene glycol polymers derived from monomer units of the formula:

$$-O-(CH_2)_n-O-$$

wherein n is an integer greater than 1 and in which at least a portion of said polymer is comprised of monomer units having n equal to or greater than 3.

25. The method of claim 24 wherein the Noble metal is selected from the group consisting of platinum, palladium, rhodium, ruthenium, iridium, osmium, silver or gold and the protective agent has a molecular weight of from between about 200–200,000.

26. The method of claim 24 wherein the protective agent is a copolymer of ethylene glycol and propylene glycol.

27. The method of claim 26 wherein the protective agent is Carbowax 20-M.

28. The method of claim 24 wherein the Noble metal is platinum or palladium and the protective agent is a copolymer of ethylene glycol and propylene glycol.

29. The method of claim 28 wherein the Noble metal is platinum in colloidal form and the protective agent is Carbowax 20-M.

30. The method of claim 24 wherein the catalyst particle size is no greater than 50 Å.

* * * * *